Feb. 11, 1947.  E. DOMINGO  2,415,732
MICROSCOPE CONDENSER
Filed May 19, 1944  3 Sheets-Sheet 1
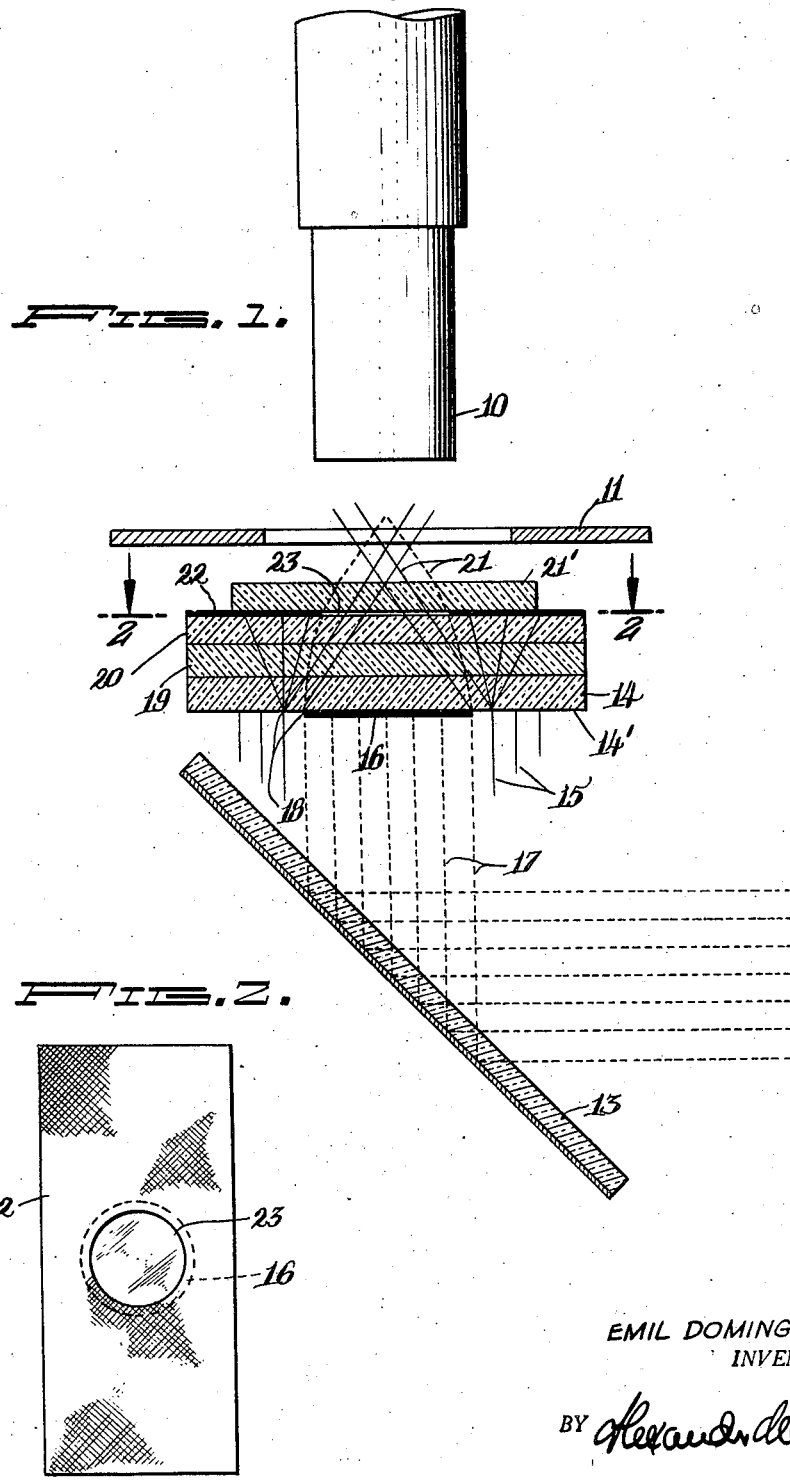
EMIL DOMINGO
INVENTOR.

Feb. 11, 1947. E. DOMINGO 2,415,732
MICROSCOPE CONDENSER
Filed May 19, 1944 3 Sheets-Sheet 2

EMIL DOMINGO
INVENTOR.

BY
ATTORNEY.

Feb. 11, 1947.  E. DOMINGO  2,415,732
MICROSCOPE CONDENSER
Filed May 19, 1944  3 Sheets-Sheet 3
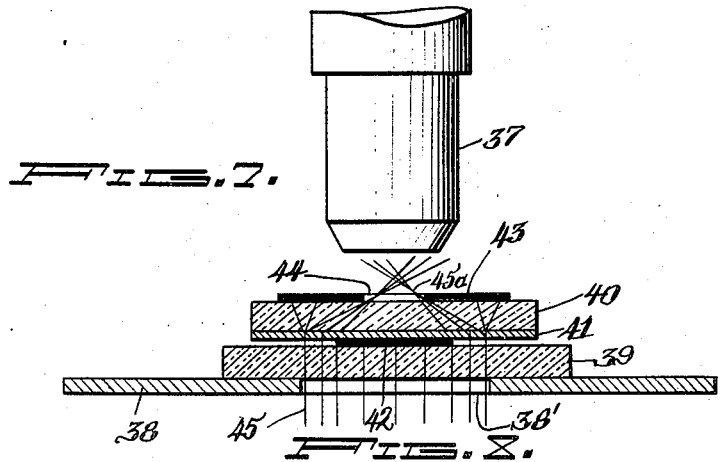
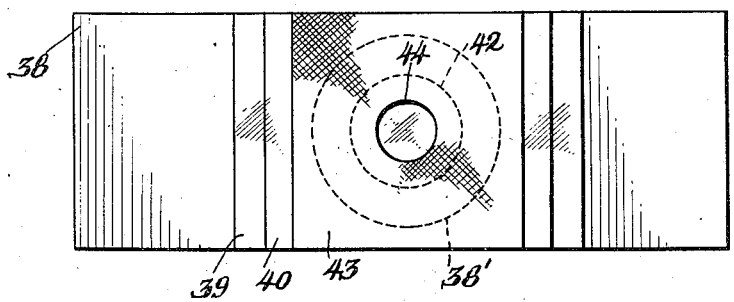
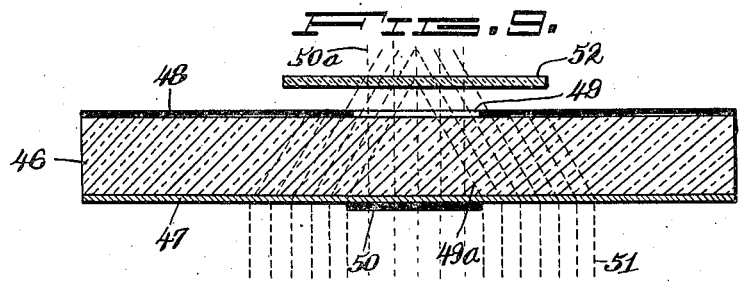
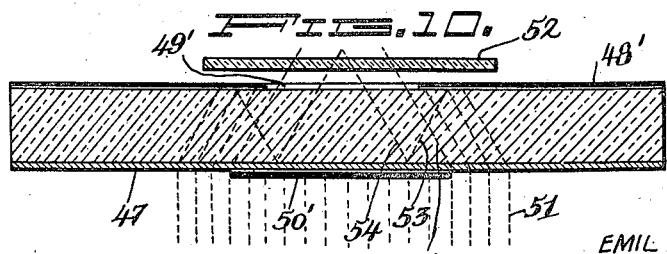
INVENTOR.
EMIL DOMINGO
BY
ATTORNEY.

Patented Feb. 11, 1947

2,415,732

UNITED STATES PATENT OFFICE 2,415,732

MICROSCOPE CONDENSER

Emil Domingo, New York, N. Y.

Application May 19, 1944, Serial No. 536,396

2 Claims. (Cl. 88—40)

This invention relates generally to illuminators having an application to microscope condensers for the production of dark-ground and light-ground illumination, but more particularly to an illuminator or condenser having plane and parallel surfaces.

The main object of the invention resides in the provision of a plate illuminator wherein the members are comprised of plane and parallel surfaces comprised of glass, composition or film and which require no optical grinding.

A further object of the invention resides in the provision of a plate illuminator of the above mentioned characteristics having dark-ground stops or masks for dark-ground illumination and a semi-translucent stop for light-ground illumination.

Another object of the invention resides in the economy of manufacture of various types of plate illuminators for dark-ground illumination, light-ground illumination and combinations thereof.

These objects and other incidental ends and advantages of the invention will hereinafter appear in the progress of the disclosure and as pointed out in the appended claims.

Accompanying this specification are drawings showing preferred forms of the invention wherein:

Figure 1 is a sectional view of a plate illuminator having dark-ground illumination and in association with a reflector and a microscope.

Figure 2 is a reduced view in elevation of Figure 1 along the plane 2—2 thereof.

Figure 7 is a sectional view of a plate illuminator in association with a microscope showing a modified form and having dark-ground illumination.

Figure 8 is a top plan view of the illuminator shown in Figure 7.

Figure 9 is a sectional view of a plate illuminator showing a further modified form and giving a combined light and dark-ground illumination.

Figure 10 is a sectional view of a plate illuminator of still another form and giving a combination of light and dark-ground illumination by reflection.

Figure 3:
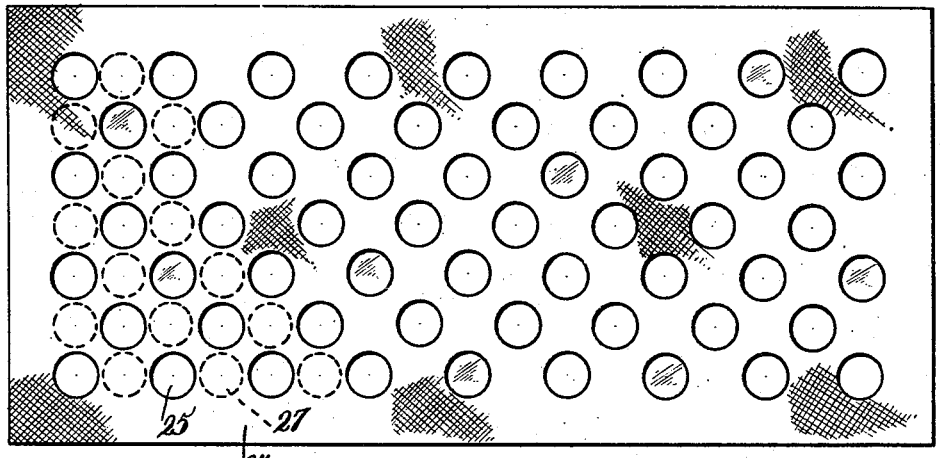
Figure 3 is a top view of a multi-unit plate illuminator adapted to give dark field illumination for objects of extensive dimensions.

In accordance with the preferred form of the invention shown in Figures 1 and 2, numeral 10 indicates generally a microscope, 11 a stage therefor and 12 a reflector for the source of illumination. The illuminator is comprised of a plane scattering and diffusing surface such as is afforded by a plate of ground glass, opal or composition 14, or as may be afforded by a film 14' attached to the lower side of plate 14 and containing finely dispersed particles. The purpose of a scattering and diffusing medium is to scatter incident light beams such as 15 into rays fanning out or diverging from a point.

A dark-ground stop 16 of any desirable shape and which may be in the form of paint, a metal disk or other light arresting substance is disposed concentrically with the vertical axis of the illuminator and as shown is associated with the under surface of plate 14.

Stop 16 serves to cut off the central incident beams 17 while the incident beams beyond the dark-ground stop 16 fan out in the form of rays 18 and may be refracted by any medium such as liquid or by one or more plane glass or composition plates 19 and 20 lying parallel with the scattering and diffusing surface 14 or 14'. The light rays coming out at different angles from plate 20 will emerge over the stop 16 at an angle to normal leaving the central axial rays 17 cut off. The scattered and diffused light beams 15 will emerge as oblique beams 21 in all directions after refraction by the intervening medium such as plates 19 and 20 between the scattering and diffusing surface 14 or 14' and the plane of emergence such as the upper surface of plate 20.

To confine the rays 21 emerging from the refracting medium such as glass or composition plate 20 or through an additional parallel plate 21', an upper or second dark-ground stop 22 disposed concentrically of the vertical axis of the illuminator is utilized to cut out undesirable rays. Stop 22 has a central aperture 23 which may be described as the field of view or the illuminating area, this aperture being in alignment with the lower stop 16 and being smaller or equal in diameter therewith. As shown, stop 22 is applied to the surface of any refracting medium such as plate 20, but the important consideration is that the spacing afforded by the refracting medium or media between the stops 16 and 22 must be such that the undesirable and more vertical and refracted rays be cut out and the more oblique refracted rays be allowed to pass through stop 22.

By shutting off the central rays by means of lower stop 16, a hollow cone of emergent light is formed and an object put in the field of view is illuminated by oblique rays only and will appear bright in a dark-ground when viewed under a microscope or otherwise. Thus, light is concentrated in a small area perpendicular to normal or the vertical axis of the illuminator without the use of optical lenses and the bending of light with respect to normal over large angles is also accomplished without the need of lenses.

The plate illuminator described may also be used in conjunction with spherical surfaces or lenses merely as an adjunct to the illuminator unit. All of the surfaces above used, it is to be noted, are plane and parallel and are integrated as a homogeneous or optically transparent unit by means of adhesives having adequate indices of refraction such as cement, balsam, oil, glycerine and other like materials.

In Figures 3–6 are shown two forms of modified plate illuminators wherein the dark-ground stops of each form are suitably spaced by an intervening refracting medium. In both of these illuminators, the upper stops are provided with a series of prearranged apertures thereby forming a plurality of illuminated areas while the lower stops are also provided with a series of prearranged apertures which are in staggered relationship with respect to the apertures of the upper stops. Objects put in the field of view of the illuminators, which may be characterized as multi-unit illuminators, shown in Figures 3–6 will appear bright in a dark ground and may be of extensive dimensions.

Figure 5:
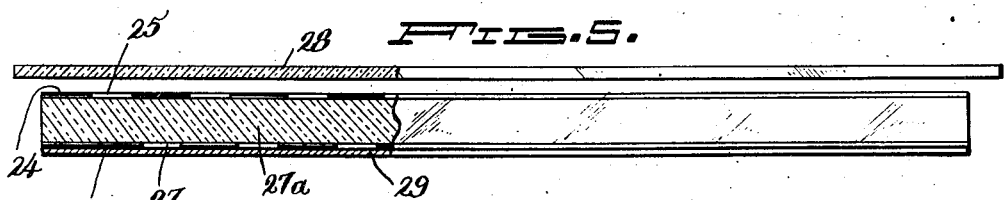
Figure 5 is a sectional view of the illuminator shown in Figure 3.

Thus with the multi-unit illuminator shown in Figures 3 and 5 the upper dark-ground stop 24 is provided with a plurality of prearranged orifices 25 while the lower dark ground stop 26 is provided with a plurality of prearranged orifices 27 staggered in relationship to orifices 25. As shown in Figure 5, stops 24 and 26 are associated with the opposite surfaces of a refracting medium 27a and a light diffusing and scattering surface 29 is also associated with medium 27a below lower stop 26. It is to be noted that the stop portions of 24 between apertures 25 are in alignment with apertures 27 of the lower stop and are greater or equal in size to cut out undesirable rays so that when viewing an object on object holder 28, the object is viewed against a dark ground.

Figure 4:
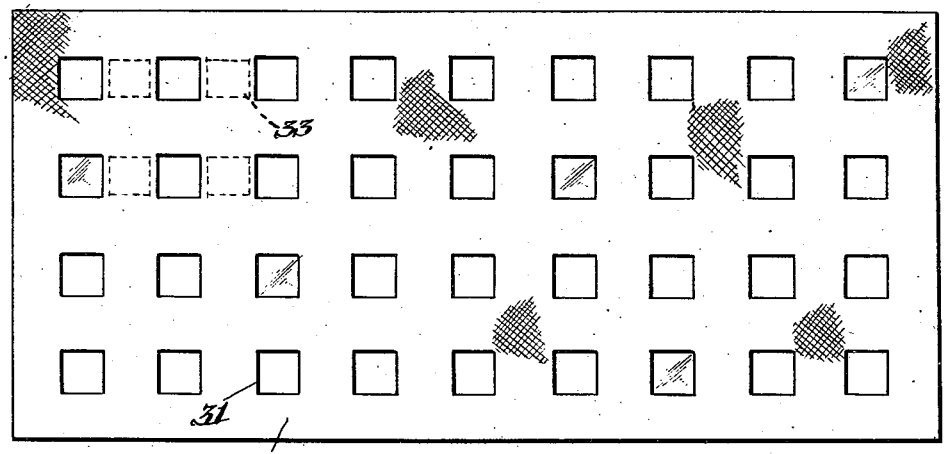
Figure 4 is a view similar to Figure 3 showing another type of multi-unit plate illuminator.
Figure 6:
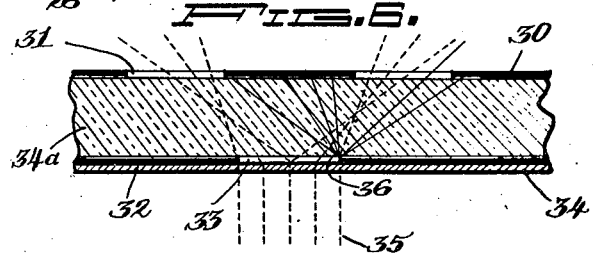
Figure 6 is a sectional view of the illuminator shown in Figure 4.

The multi-unit illuminator shown in Figures 4 and 6 is similar to that shown in Figures 3 and 5. Thus, the upper stop 30 has a plurality of prearranged apertures 31 while the lower stop 32 has apertures 33 staggered in relation thereto. A light diffusing and scattering surface 34 is also provided below stop 32 which latter as shown in association with the refracting medium 34a intermediate the upper and lower stops. Only the more oblique refracted rays 36 of the incident light beams 35, as shown in Figure 6, passing through an aperture 33 of the lower stop are allowed through to illuminate the field of view as through adjacent apertures 31 against a dark ground as afforded by lower stop 32.

In Figures 7 and 8 is shown an illuminator utilizing the principles of that shown in Figures 1 and 2 but showing different positions of the stops with respect to refracting media. Thus, a microscope 37 having a stage 38 and an opening 38' therein is provided with a plate illuminator having a lower refracting medium or plate 39 and an upper medium or plate 40. The lower surface of plate 40 has a light scattering and diffusing surface 41 while a lower stop 42 is disposed between surface 41 and the upper surface of plate 39. An upper stop 43 having a central aperture 44 is disposed on the upper surface of plate 40 and it is through this aperture that refracted and oblique rays 45a from those incident beams 45 that are not cut off by stop 42 pass.

In Figure 9 is shown a plate illuminator which affords illumination for an object against a combination light and dark-ground by the use of a lower stop being of semi-translucent nature. Thus, the refracting medium or plate 46 has on the lower surface thereof a light-scattering and diffusing surface 47, an upper dark-ground stop 48 having a central aperture 49 and a lower semi-translucent stop 50 disposed on the under wall of surface 47. Incident beams of light 51 beyond lower stop 50 emerge as oblique and refracted rays 49a through aperture 49 and object holder 52. These oblique rays would illuminate the field of view against a dark ground if stop 50 were opaque. But since stop 50 is semi-translucent, refracted rays 50a emanating from incident beams beneath stop 50 will pass through aperture 49 and the object holder 52 thereby affording a partial light ground.

In Figure 10 is shown a plate illuminator which affords illumination for an object against a combination light and dark ground by the use of reflected rays instead of a semi-transparent lower stop. Thus the upper stop 48' has a reflecting undersurface and a central aperture 49'. Some of the incident beams 51 beyond lower stop 50' (which has an upper light scattering and reflecting surface) emerge as oblique and refracted rays 51a which afford a dark ground while other oblique and refracted rays are reflected from the undersurface of 48' as rays 53 to the upper surface of 50' as rays 54 to pass through the aperture 49'. The latter rays 54 afford light ground illumination.

It is thus seen that an illuminator comprised of plane and parallel surfaces may perform the functions of condenser lenses for light and dark-ground illumination in a simple and inexpensive manner. Such an illuminator may be used alone or in combination with independent lenses and may be made by anyone to suit his or her needs without the necessity of expensive materials and equipment.

I wish it understood that the invention contemplates all forms embraced within the appended claims and that the materials used for the stops, refractive and scattering or diffusing media may be those conventionally used in the trade.

I claim:

1. A microscope illuminator comprising a plane scattering and diffusing surface for incident beams of light, a refracting medium parallel therewith to cause the rays scattered and diffused by said surface to emerge obliquely from the upper surface of said refracting medium, a stop and a second upper stop having a central aperture, the said stops being concentrically arranged and parallel with said surface and medium and spaced from each other whereby the upper stop cuts out the more vertical refracted rays and allows the more oblique and refracted rays to come through the central aperture.

2. A microscope illuminator comprising a plane scattering and diffusing surface for incident beams of light, a refracting medium parallel therewith to cause the rays scattered and diffused by said surface to emerge obliquely from the upper surface of said refracting medium, a dark ground stop and a second upper dark ground stop having a central aperture, the said stops being concentrically arranged and parallel with said surface and medium and spaced from each other whereby the upper stop cuts out the more vertical refracted rays and allows the more oblique and refracted rays to come through the central aperture.

EMIL DOMINGO.

REFERENCES CITED

The following references are of record in the file of this patent:

UNITED STATES PATENTS

| Number | Name | Date |
| --- | --- | --- |
| 929,795 | Siedentopf | Aug. 3, 1909 |
| 1,157,257 | Siedentopf | Oct. 19, 1915 |
| 1,427,714 | Beck | Aug. 29, 1922 |
| 1,461,367 | Ott et al. | July 10, 1923 |
| 1,938,085 | Page | Dec. 5, 1933 |

FOREIGN PATENTS

| Number | Country | Date |
| --- | --- | --- |
| 201,414 | British | Aug. 2, 1923 |